Sept. 3, 1968 J. VAN MALLAND 3,399,613
LIGHT COPYING DEVICE WITH A COOLING ARRANGEMENT
Filed June 30, 1966

INVENTOR.
JAN VAN MALLAND
BY
AGENT

United States Patent Office 3,399,613
Patented Sept. 3, 1968

3,399,613
LIGHT COPYING DEVICE WITH A COOLING
ARRANGEMENT
Jan Van Malland, Emmasingel, Eindhoven, Netherlands, assignor to North American Philips Company, Inc., New York, N.Y., a corporation of Delaware
Filed June 30, 1966, Ser. No. 561,835
Claims priority, application Netherlands, July 3, 1965, 6508597
2 Claims. (Cl. 95—77.5)

The invention relates to a light copying device with a cooling arrangement, comprising a light source in the form of an elongated gas-discharge body, which is housed in a transparent cylindrical body which is rotatable about its axis of revolution and the outer periphery of which constitutes a copying surface on a peripheral part of which light copying material with an original to be copied and a copy carrier can be disposed, a dividing duct with an outlet port of the cooling device which provides a flow of coolant for cooling the copying surface being arranged along the outer periphery of the cylindrical body in the direction of its length and outside the region in which the light copying material is applicable.

A device of this kind is known. Although in this device an intense cooling of the copying surface can be obtained, so that the temperature of the light copying material remains below the requirements imposed therefor, i.e. for example below 60° to 70° C., whilst nevertheless the light source can operate at a required high operational temperature, at which extinction of the light source is impossible, since the coolant flow does not detrimentally affect the light source. This known device has the disadvantage that a comparatively large amount of coolant per unit time is necessary for the desired cooling of the reproduction surface. In fact, in this device the coolant, air, leaves the dividing duct through a plurality of small apertures provided in the wall of the dividing duct and along a generatrix thereof. The cooling air once having emerged from the apertures comes into contact with the copying surface for a short period only to escape eventually to the atmosphere. Consequently the cooling effect of the air is little effective and under certain conditions it is therefore necessary to use a plurality of dividing ducts, from which the above-mentioned high consumption of coolant results.

The invention has for its object to mitigate this disadvantage and is characterized in that the outlet port of the dividing duct extends as a slot-shaped aperture mainly throughout the length of the cylindrical body and is bounded on the one hand by a bending face extending up to the cylindrical body and on the other hand by a face arranged at a distance from the cylindrical body, concentrically thereto and extending over part of the circumference thereof, the latter face together with the cylindrical body forming a duct which is a prolongation of the dividing duct of the cooling device.

It is ensured by this measure, that the flow of coolant passes along part of the outer periphery of the cylindrical body and is thus in contact with this body for some time, so that the cooling effect is highly increased.

In one preferred embodiment of the device according to the invention the bending face has a curvature in a sense opposite to the sense of rotation of the cylindrical body from which results the principle of the counterflow cooling as known per se in cooling devices.

The invention will now be described with reference to the drawing, which shows an embodiment of the device according to the invention.

Figure 1:
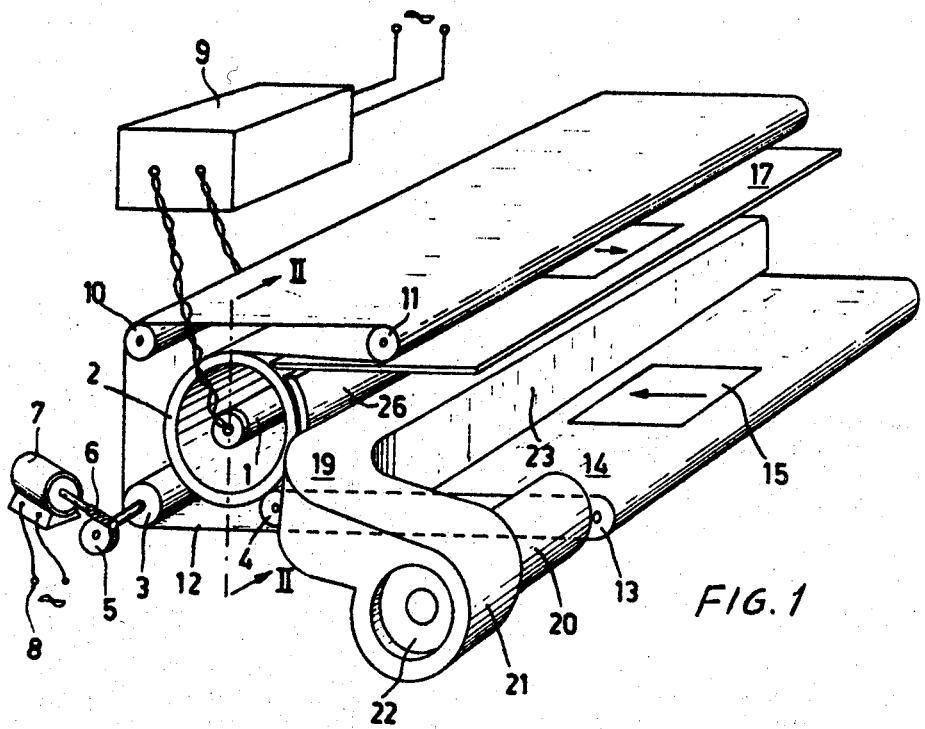
FIG. 1 shows diagrammatically and perspectively a light copying device according to the invention.

Referring to the figures, reference numeral 1 designates a light source formed by a tubular gas discharge lamp. The light source 1 is arranged in a transparent cylindrical body 2, adapted to rotate about its axis of rotation. For this purpose the body is supported by rollers 3 and 4, the roller 3 being driven via a worm and a worm wheel 5 and 6 respectively by a motor 7, when the latter is connected to a current source 8. The current source 8 also feeds the light source 1, whilst a suitable series apparatus 9 (not further described) is provided.

Above the cylindrical body 2 two further rollers 10 and 11 are provided, which serve, together with the cylindrical body 2 and the rollers 3 and 4, for guiding an endless belt 12, which is furthermore guided along a reverse roller 13.

When light copying material 15 in the form of an original to be copied and a copy carrier beneath it is disposed on the portion 14 of the belt 12, this material is conveyed by the belt 12 along the roller 4 and a portion 16 of the outer periphery of the cylindrical body 2, the roller 3 driving the assembly. On the upper side of the body 2 the belt 12 leaves this body and the light copying material is released. It drops on a table 17. The belt 12 travels along the rollers 11 and 10 back to the rollers 3 and 13.

Figure 2:
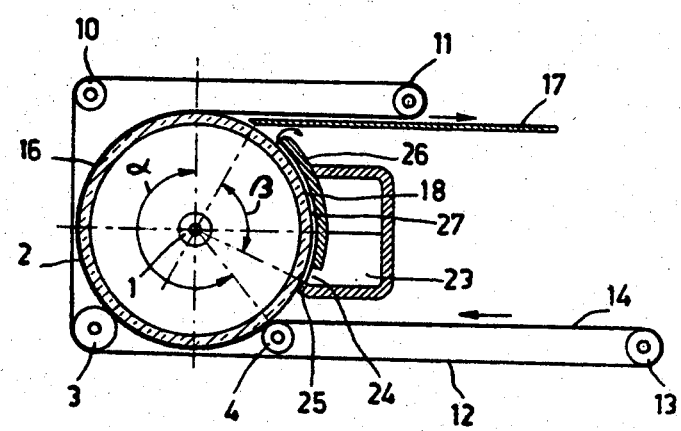
FIG. 2 shows diagrammatically a cross-sectional view taken on the line II—II in FIG. 1.

In the device described above the cylindrical body 2 serves as a copying surface, the portion 16 of which, defined by a sector having an angle $\alpha$ at the center (see FIG. 2) forms the contact surface, on which the copying material is disposed by means of the belt 12, for exposing the material to the light source 1.

The further portion 18 of the outer periphery of the body 2 defined by a sector having an angle $\beta$ at the centre, is cooled by a coolant formed by air. For this purpose, a cooling member 19 is provided, which comprises a fan 21, driven by an electric motor 20. The fan draws air through the opening 22 and blows it into a dividing duct 23. The duct 23 has an outlet port 24, located on the lower side of the portion 18 of the outer periphery of the body 2. The opening 24 extends substantially throughout the length of the body 2. The outlet port 24 is bounded on the one hand by a bending face 25, extending up to the cylindrical body and on the other hand by a face 26, arranged at a distance from the body 2, concentrically thereto. The face 26, together with the portion 18 of the body 2, forms a duct 27, forming a prolongation of the dividing duct 23. The bending face 25 has a curvature in a sense opposite the sense of rotation of the body 2. The air emanating from the port 24 is directed opposite said direction of rotation. The air passing through the duct 27 cools the outer periphery of the body 2 therefore by a counter flow.

In order to obtain a uniform flow from the port 24, the dividing duct 23 has a cross section gradually diminishing in the direction of flow of the air.

In the light copying device described above the copying surface is cooled completely outside the space accommodating the light source. The light source is therefore not hindered by said cooling, so that its reliability in operation is very great. The risk of extinction of the light source due to too low an ambient temperature is excluded. A further advantage of the cooling outside said space is that there is no need for providing in said space screening parts for preventing the coolant from cooling too strongly the surroundings of the light source. Therefore, the radiation supplied by the light source can strike directly the reproduction surface. The light output of the source is consequently utilized with great efficiency.

What is claimed is:

1. A light copying device with a cooling arrangement, comprising a light source in the form of an elongated gas-discharge body, which is housed in a transparent cylindrical body which is rotatable about its axis of revolution and the outer periphery of which constitutes a copying surface, on a peripheral part of which can be disposed light copying material with an original to be copied and a copy carrier, a dividing duct with an outlet port of the cooling device which provides a flow of coolant to cool the copying surface being arranged along the outer periphery of the cylindrical body in the direction of its length and outside the region in which the light copying material is applicable, characterized in that the outlet port of the dividing duct extends as a slot-shaped aperture mainly throughout the length of the cylindrical body and is bounded on the one hand by a bending face extending up to the cylindrical body and on the other hand by a face arranged at a distance from the cylindrical body, concentrically thereto and extending over part of the circumference thereof, the latter face, together with the cylindrical body, forming a duct which is a prolongation of the dividing duct of the cooling device.

2. A light copying device as claimed in claim 1, characterized in that the bending face has a curvature in a sense opposite to the sense of rotation of the cylindrical body.

References Cited

UNITED STATES PATENTS 3,272,108   9/1966   Tosio Isikawa _____ 95—77.5

NORTON ANSHER, *Primary Examiner.*

C. B. FUNK, *Assistant Examiner.*